(12) United States Patent
Jurzak et al.

(10) Patent No.: US 10,719,198 B2
(45) Date of Patent: Jul. 21, 2020

(54) METHOD FOR ASSOCIATING A GROUP OF APPLICATIONS WITH A SPECIFIC SHAPE

(71) Applicant: MOTOROLA SOLUTIONS, INC., Chicago, IL (US)

(72) Inventors: Pawel Jurzak, Cracow (PL); Kai Tan, SiChuan (CN)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 113 days.

(21) Appl. No.: 15/773,903

(22) PCT Filed: Dec. 2, 2015

(86) PCT No.: PCT/PL2015/050067
§ 371 (c)(1),
(2) Date: May 4, 2018

(87) PCT Pub. No.: WO2017/095247
PCT Pub. Date: Jun. 8, 2017

(65) Prior Publication Data
US 2018/0329606 A1   Nov. 15, 2018

(51) Int. Cl.
| G06F 3/0481 | (2013.01) |
| G06F 9/451  | (2018.01) |
| G06F 3/0482 | (2013.01) |
| G06F 3/0488 | (2013.01) |
| G06F 3/0484 | (2013.01) |
| H04M 1/27475 | (2020.01) |

(52) U.S. Cl.
CPC ........ *G06F 3/04817* (2013.01); *G06F 3/0481* (2013.01); *G06F 3/0482* (2013.01);
(Continued)

(58) Field of Classification Search
CPC .. G06F 3/04817; G06F 9/451; G06F 3/04842; G06F 3/04883; G06F 3/0484;
(Continued)

(56) References Cited

U.S. PATENT DOCUMENTS

| 8,640,046 B1 | 1/2014 | Jania et al. | |
| 2010/0123724 A1* | 5/2010 | Moore | G06F 3/04817 345/473 |

(Continued)

OTHER PUBLICATIONS

PCT/PL2015/050067 International Search Report and Written Opinion of the International Searching Authority dated Jun. 29, 2016 (16 pages).

*Primary Examiner* — Anil K Bhargava
(74) *Attorney, Agent, or Firm* — Michael Best & Friedrich LLP

(57) ABSTRACT

A method of displaying icons in a graphical user interface displayed on a touch screen of a portable electronic device. The method includes associating, with an electronic processor of the portable electronic device, a first subset of icons of a plurality of icons with a first selected gesture. The first selected gesture has a first shape. The method further includes detecting, with the touch screen and the electronic processor of the portable electronic device, whether the first selected gesture is made on the touch screen. The method further includes displaying, with the touch screen of the portable electronic device, the first subset of icons on the touch screen when the first selected gesture is detected.

18 Claims, 13 Drawing Sheets

(52) U.S. Cl.
CPC .......... *G06F 3/0484* (2013.01); *G06F 3/0488* (2013.01); *G06F 3/04842* (2013.01); *G06F 3/04883* (2013.01); *G06F 9/451* (2018.02); *H04M 1/27475* (2020.01); *H04M 2250/22* (2013.01)

(58) Field of Classification Search
CPC .... G06F 3/0482; G06F 3/0481; G06F 3/0488; H04M 1/27455; H04M 2250/22
See application file for complete search history.

(56) References Cited

U.S. PATENT DOCUMENTS

| | | |
|---|---|---|
| 2010/0229129 A1 | 9/2010 | Price et al. |
| 2010/0315358 A1* | 12/2010 | Chang ................ G06F 3/04883 345/173 |
| 2011/0047517 A1* | 2/2011 | Lee ........................ G06F 16/58 715/863 |
| 2011/0271236 A1 | 11/2011 | Jain |
| 2012/0180001 A1 | 7/2012 | Griffin et al. |
| 2013/0167055 A1* | 6/2013 | Penev .................. G06F 3/0482 715/765 |
| 2013/0263251 A1 | 10/2013 | Fleizach et al. |
| 2013/0347102 A1 | 12/2013 | Shi |
| 2014/0068519 A1* | 3/2014 | Nam ............... H04M 1/274533 715/838 |
| 2014/0165007 A1* | 6/2014 | Heo ...................... G06F 3/0481 715/835 |
| 2016/0205524 A1* | 7/2016 | Wawrowski ............ H04W 4/50 455/404.1 |

\* cited by examiner

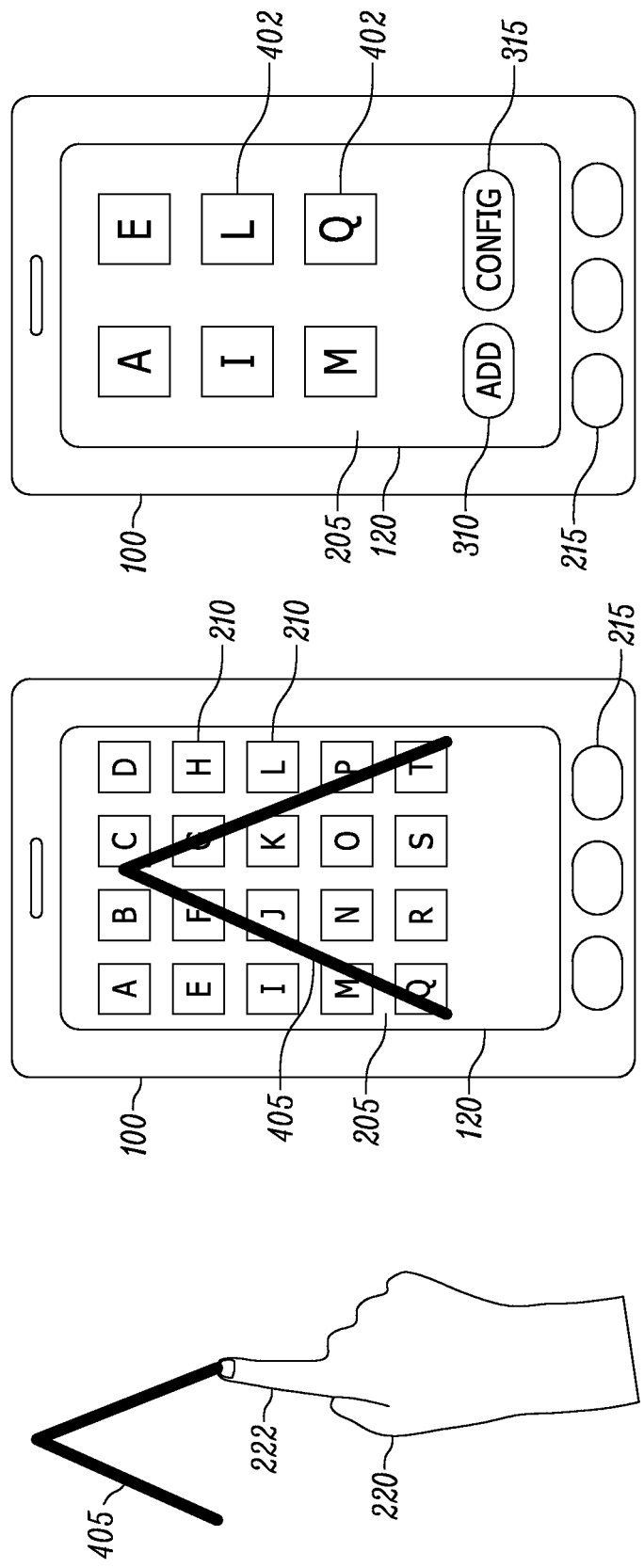

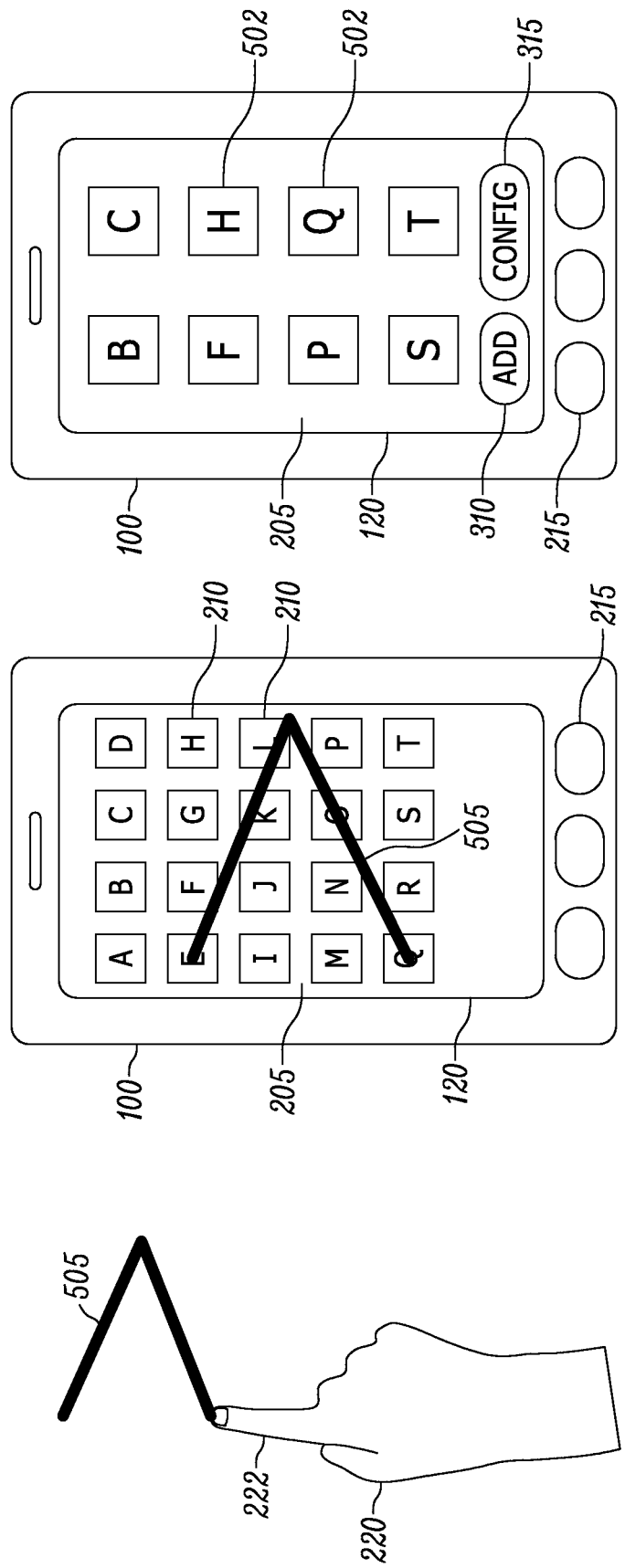

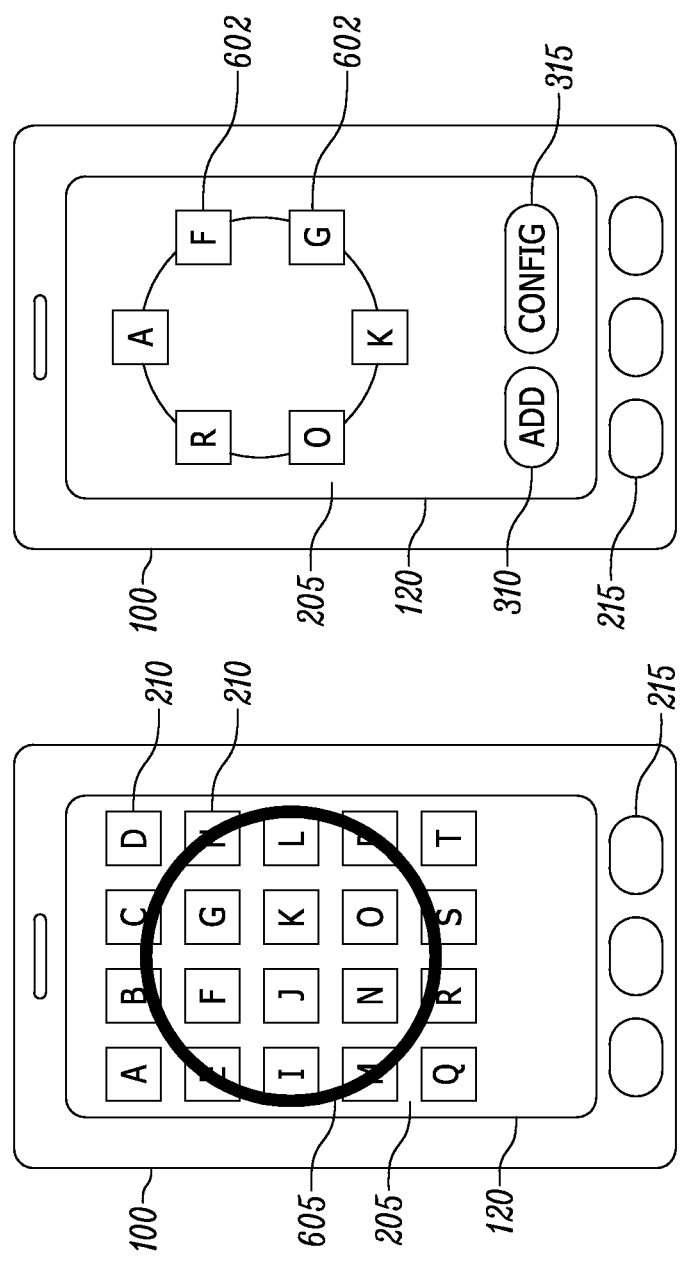
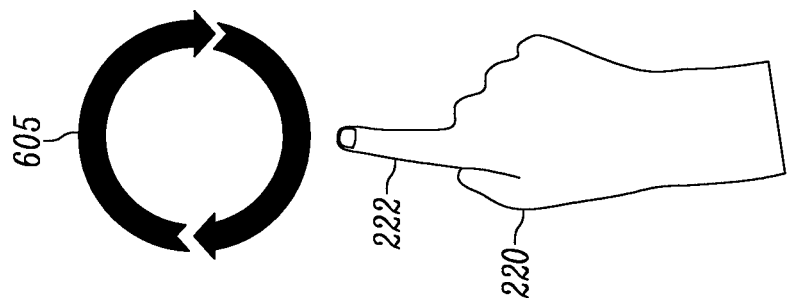
FIG. 6A  FIG. 6B  FIG. 6C

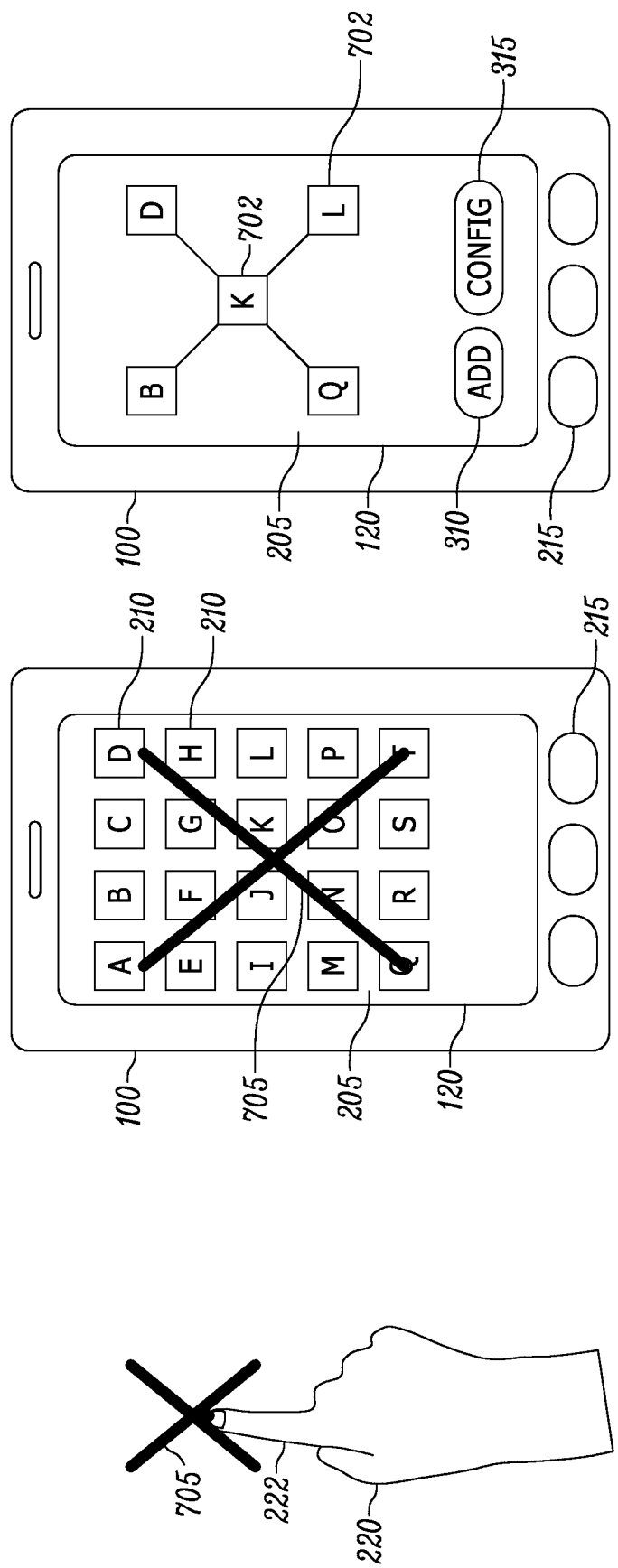

METHOD FOR ASSOCIATING A GROUP OF APPLICATIONS WITH A SPECIFIC SHAPE

BACKGROUND OF THE INVENTION

Touch screens are used in many computers and similar devices such as, for example, tablets and smart telephones. A touch screen is a display on which various visual outputs and a graphical user interface may be displayed. A touch screen is also an input device that is sensitive to contact from, for example, a stylus or a user's finger. Thus, a touch screen enables a user to interact with a device by touching (and selecting) pictures, words, icons, or other items displayed on the touch screen. Typically, multiple software applications are installed on touch-screen-equipped devices. For example, in a bring-your-own-device environment a smart telephone may include various software applications (or "apps")—some for personal purposes and some for business purposes. Generally, each software application is represented by an application icon. It may be time-consuming for a user to search for a desired application icon when a certain application is desired to be run. Additionally, it may be important for the user to quickly launch the desired application.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 4A illustrates a first gesture.

FIGS. 4B and 4C illustrate the portable electronic device displaying a subset of icons in response to the first gesture being made on a touch screen of the portable electronic device.

FIG. 5A illustrates a second gesture.

FIGS. 5B and 5C illustrate the portable electronic device displaying another subset of icons in response to the second gesture being made on the touch screen of the portable electronic device.

FIG. 6A illustrates a third gesture.

FIGS. 6B and 6C illustrate the portable electronic device displaying another subset of icons in response to the third gesture being made on the touch screen of the portable electronic device.

FIG. 7A illustrates a fourth gesture.

FIGS. 7B and 7C illustrate the portable electronic device displaying yet another subset of icons in response to the fourth gesture being made on the touch screen of the portable electronic device.

Figure 1:
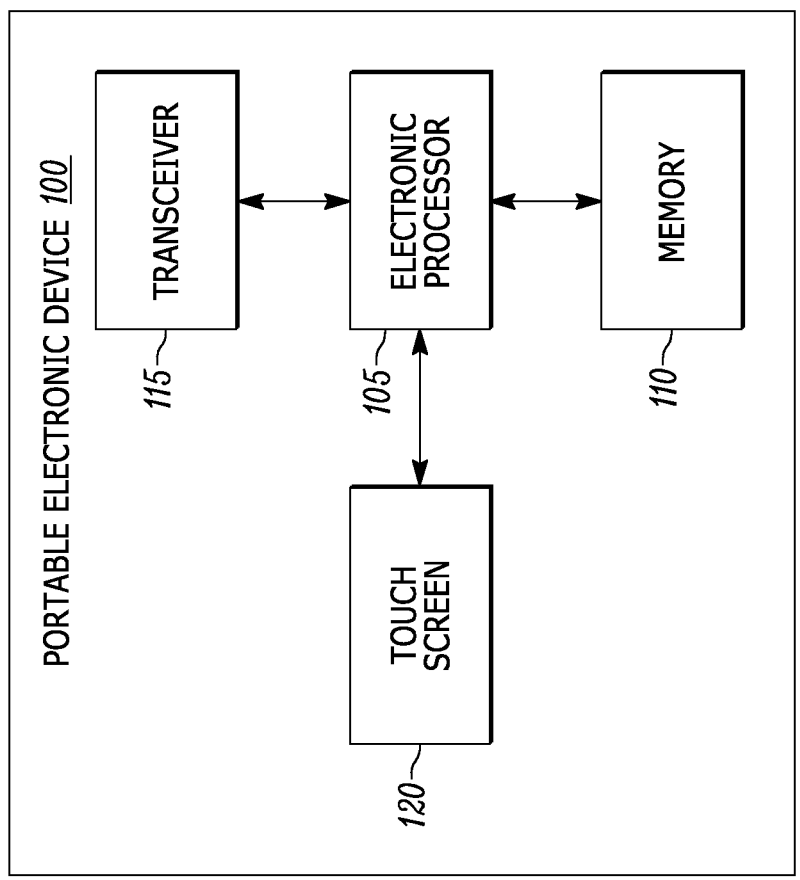
FIG. 1 illustrates a block diagram of a portable electronic device in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One embodiment provides a method of displaying icons in a graphical user interface displayed on a touch screen of a portable electronic device. In one example, the method includes associating, with an electronic processor of the portable electronic device, a first subset of icons of a plurality of icons with a first selected gesture. The first selected gesture has a first shape. The method further includes detecting, with the touch screen and the electronic processor of the portable electronic device, whether the first selected gesture is made on the touch screen. The method further includes displaying, with the touch screen of the portable electronic device, the first subset of icons on the touch screen when the first selected gesture is detected.

Another embodiment provides a portable electronic device. In one example, the portable electronic device includes a memory, a touch screen, and an electronic processor. The electronic processor associates a first subset of icons of a plurality of icons with a first selected gesture having a first shape. The electronic processor further detects whether the first selected gesture is made on the touch screen. When the first selected gesture is detected, the electronic processor controls the touch screen to display the first subset of icons on the touch screen.

Yet another embodiment provides a method of displaying icons on a touch screen of a portable electronic device. The method includes displaying on the touch screen a gesture input request indicating that a gesture be made on the touch screen. The method further includes reading the gesture from the touch screen and storing a representation of the gesture in a memory of the portable electronic device as a first selected gesture. The first selected gesture has a first shape. The method further includes displaying a plurality of icons on the touch screen. The method further includes displaying on the touch screen an icon selection request indicating that a selection from the plurality of icons be performed. The selection from the plurality of icons generates a first subset of icons. The method further includes reading an input on the touch screen and determining whether the input matches the first selected gesture. When the input matches the first selected gesture, the method further includes displaying the first subset of icons on the touch screen.

FIG. 1 illustrates a portable electronic device 100 in one exemplary embodiment. In the particular embodiment illustrated, the portable electronic device 100 is a communication device, for example, a two-way radio or smart telephone. The portable electronic device 100 includes an electronic processor 105 and a memory 110. The memory 110 may be a computer-readable, non-transitory memory device and may include one or more memory components such as, for example, a hard disk, Random-Access Memory (RAM), Read Only Memory (ROM), Flash, or other types of memory media. The electronic processor 105 communicates with the memory 110 to access computer-executable instructions stored on the memory 110 and to read and write data from and to the memory 110. The instructions stored on the memory 110 are executed by the electronic processor 105 to provide, among other things, the functionality described below.

The portable electronic device 100 further includes a transceiver 115. Although FIG. 1 shows one transceiver 115, some embodiments of the portable electronic device 100 include more than one transceiver 115. Alternatively, in addition to or in place of the transceiver 115, some embodiments of the portable electronic device 100 include a separate transmitter and a separate receiver. The transceiver 115 may send data from the portable electronic device 100 to another device. The transceiver 115 may also receive data from another device. The electronic processor 105 may receive data from and send data to the transceiver 115. The transceiver 115 may be implemented using various types of transceivers including, but not limited to, radio frequency modems, frequency modulation two-way radios, long-term evolution (LTE) transceivers, code division multiple access (CDMA) transceivers, Wi-Fi (i.e., IEEE 802.11x) modules, etc.

The electronic processor 105 is electrically coupled to a touch screen 120. The touch screen 120 is a touch-sensitive display that includes both a display device (e.g., a liquid crystal display (LCD) screen panel) and a user input device (e.g., the touch-sensitive component that detects contact by a stylus or finger). The electronic processor 105 may receive input signals from the touch screen 120 that are generated by a user of the portable electronic device 100. The electronic processor 105 may also control the display of the touch screen 120.

Figure 2:
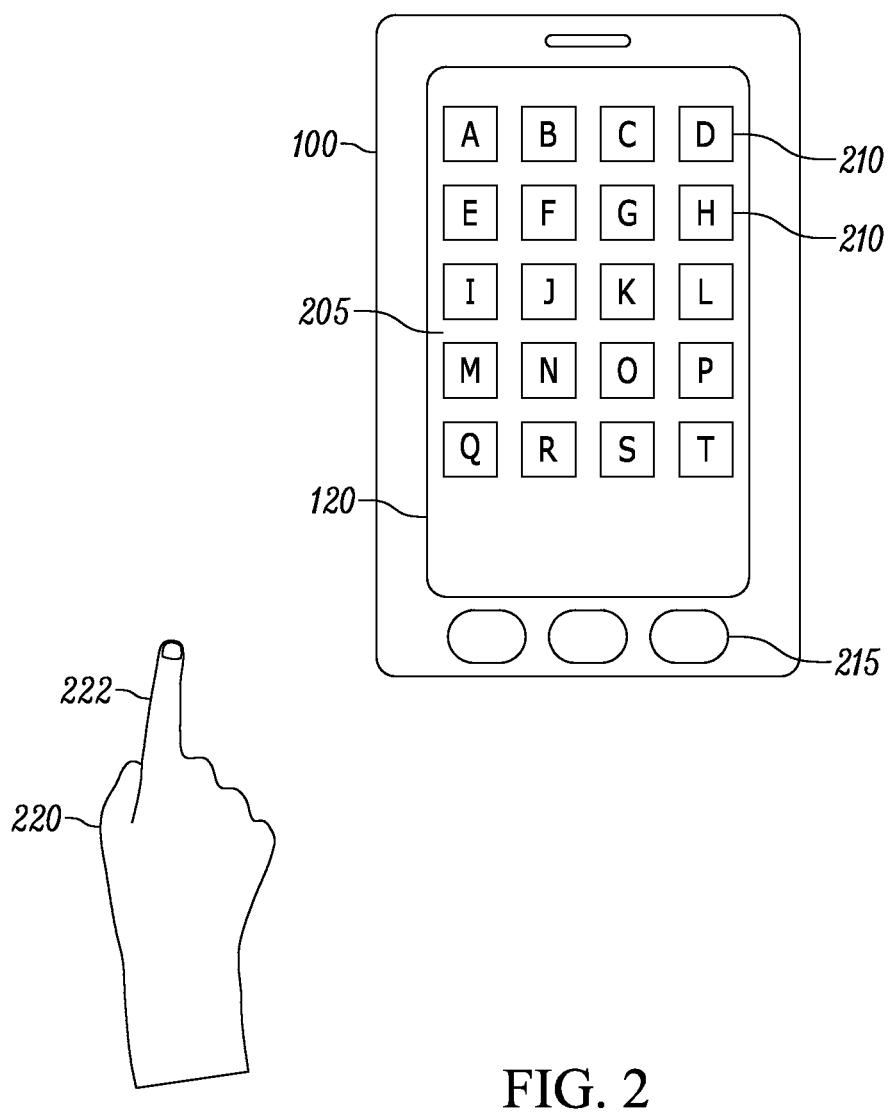
FIG. 2 illustrates a portable electronic device in accordance with some embodiments.

For example, as shown in FIG. 2, the electronic processor 105 may provide a graphical user interface 205 on the touch screen 120 of the portable electronic device 100. In FIG. 2, a plurality of icons 210 is displayed in the graphical user interface 205 on the touch screen 120. FIG. 2 shows an example of a typical home screen on a portable electronic device 100. The home screen acts as the main screen for the portable electronic device 100 and often includes a plurality of icons 210 that correspond to applications installed on the portable electronic device 100. For example, to run a desired application, the corresponding icon of the desired application is selected on the touch screen 120.

In FIG. 2, twenty icons are displayed on the home screen. The number of icons displayed on the home screen may be configurable by the user or a central identity, or, alternatively, may be preprogrammed by a manufacturer of the portable electronic device 100. Thus, the number of icons displayed on the home screen may be any number of icons. The icons in FIG. 2 are each labeled with a different letter to distinguish the icons from each other. Such a representation is merely exemplary. On the portable electronic device 100, the icons may be represented by various images (i.e., an envelope for an e-mail application, a specific business logo for an application operated by the specific business, etc.). Additionally, the icons may be represented by other images including, but not limited to, a star, an officer badge, a traffic light, and railroad tracks. Any image or indication of an icon is within the scope of the invention.

The portable electronic device 100 may also include one or more buttons 215 that provide an input signal to the electronic processor 105. FIG. 2 also shows a hand 220 of the user with an extended finger 222 that may make a gesture on the touch screen 120 as described in more detail below. As mentioned in previous paragraphs, a gesture may be made on the touch screen 120 by a stylus, a pointer, and other similar objects. The touch screen 120 may detect that the gesture (i.e., the input) is made on the touch screen 120 and may send a signal associated with the gesture to the electronic processor 105. The electronic processor 105 may determine the shape of the gesture (i.e., a path on the touch screen 120 that was made by the finger 222) and perform a predetermined function based on the shape of the gesture. The gesture may be made by the user dragging finger 222 of the hand 220 to form a shape or symbol on the touch screen 120 (i.e., an approximate circle, an approximate oval, an approximate triangle, an approximate square, an approximate heart, an approximate cross, an approximate star, an approximate letter of an alphabet, etc.). In some embodiments, the gesture may include movements where the finger 222 touches the touch screen 120 and also leaves the touch screen 120 (e.g., movement that forms an "X" on the touch screen 120 or tapping in a predetermined manner on the touch screen 120).

Figure 3:
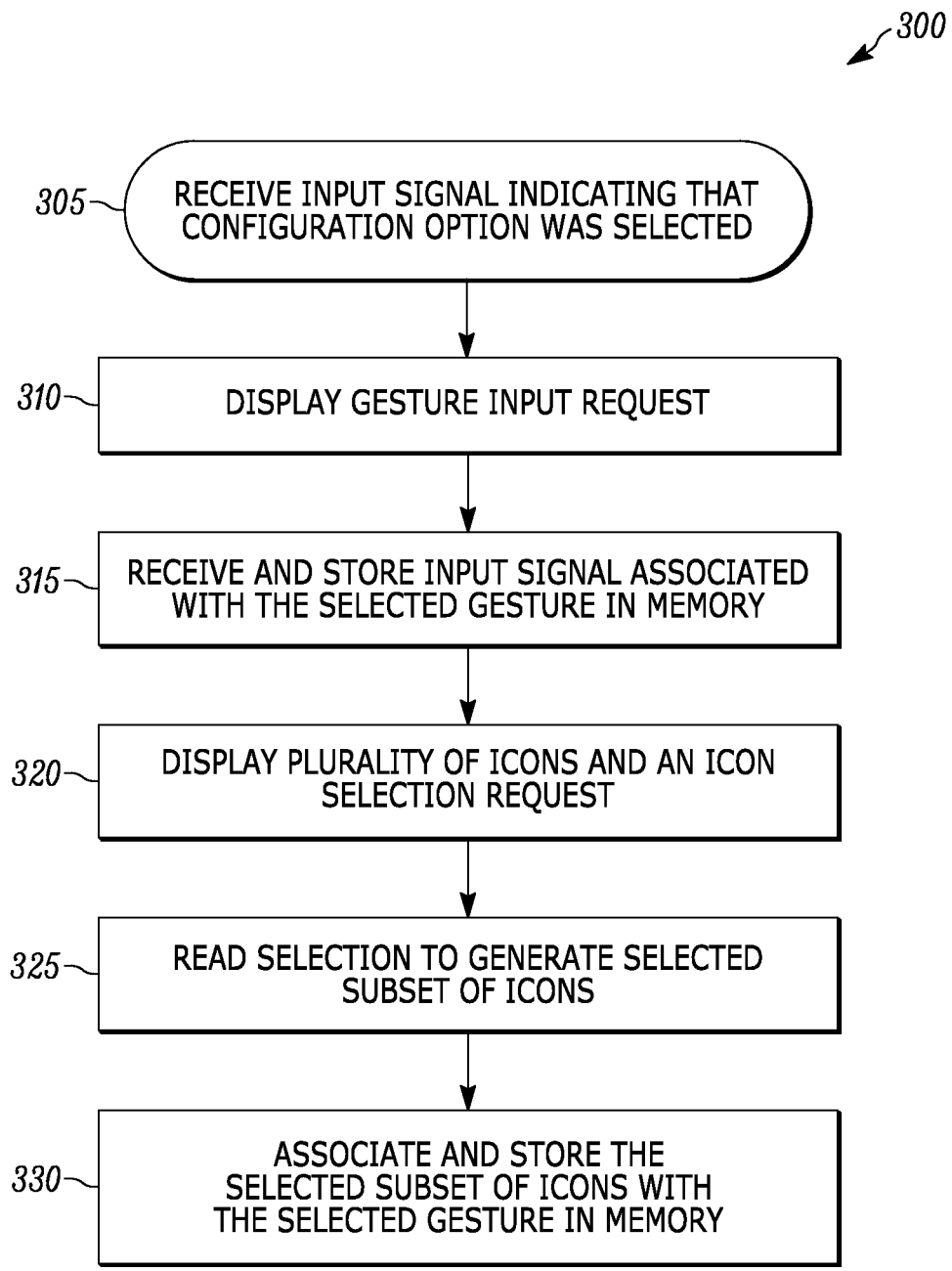
FIG. 3 illustrates a flowchart of a method of configuring the portable electronic device to display icons in accordance with some embodiments.

As illustrated by the flowchart of FIG. 3, the electronic processor 105 may be configured to display a subset of icons in the graphical user interface 205. At block 305, the electronic processor 105 receives an input signal from the touch screen 120 that indicates that a configuration option was selected. At block 310, the electronic processor 105 controls the touch screen 120 to display a gesture input request on the touch screen 120. The gesture input request provides an indication that a gesture be made on the touch screen 120. The user may make a selected gesture on the touch screen 120 in response to the gesture input request. At block 315, the electronic processor 105 receives and stores in memory an input signal from the touch screen 120 associated with the selected gesture made on the touch screen 120. The input signal may relate to a shape or a path that corresponds to the selected gesture made on the touch screen 120.

At block 320, the electronic processor 105 displays a plurality of icons 210 on the touch screen 120 and an icon selection request on the touch screen 120. The icon selection request provides an indication that a selection from the plurality of icons 210 should be performed. The user may select one or more icons from the plurality of icons 210 in response to the icon selection request. The plurality of icons 210 displayed with the icon selection request may correspond to the icons shown on the home screen of the portable electronic device 100 (see e.g., FIG. 2). In some embodiments, the plurality of icons 210 may correspond to all applications installed on the portable electronic device 100. In such embodiments, the plurality of icons 210 may be displayed on numerous pages such that the touch screen 120 has to receive an input to show all icons (i.e., swiping the hand 220 across the touch screen 120 to view different pages of icons). While some icons may be associated with an application installed on the portable electronic device 100 as described in previous paragraphs, other icons may be associated with a contact or a plurality of contacts (i.e., talk groups) stored in memory 110.

When displaying the icon selection request, the electronic processor 105 may control the touch screen 120 to display information associated with the plurality of icons 210 in different formats. For example, icons associated with applications installed on the portable electronic device 100 may be displayed on the touch screen 120 in a similar manner as the icons that are displayed on the home screen (see FIG. 2). Icons associated with contacts and talk groups may be displayed in a list on the touch screen 120. When selecting icons, there may be soft buttons in the graphical user interface 205 that allow the type of icon that is displayed to be selected (i.e., application, contact, talk group, etc.) and the format in which the information is displayed to be selected (i.e., icon format or list format).

When at least one icon is selected, at block 325, the electronic processor 105 reads the icons selected in response to the icon selection request to generate a selected subset of icons. At block 330, the electronic processor 105 associates the selected subset of icons with the selected gesture so that the selected subset of icons may be displayed on the touch screen 120 when the selected gesture is made on the touch screen 120.

FIG. 4A shows a first selected gesture 405 being made. As shown in FIGS. 4B and 4C, the electronic processor 105 may control the touch screen 120 to display a first subset of icons 402 of the plurality of icons 210 when the first selected gesture 405 is made on the touch screen 120. For example, FIG. 4A shows the finger 222 of hand 220 making the first selected gesture 405 having a first shape (in this case, an upward-oriented, open arrowhead shape). As indicated by FIG. 4B, the first selected gesture 405 begins near the bottom-left of the touch screen 120, extends to the top-center of the touch screen 120, and ends near the bottom-right of the touch screen 120. The touch screen 120 detects that the first selected gesture 405 is made and sends a signal associated with the first selected gesture 405 to the electronic processor 105. The electronic processor 105 controls the touch screen 120 to display the first subset of icons 402 of the plurality of icons 210 based on the signal associated with the first selected gesture 405. For example, FIG. 4C shows six icons of the plurality of icons 210 displayed in the graphical user interface 205. Thus, the first subset of icons 402 includes icons A, E, I, L, M, and Q and is displayed in response to the first selected gesture 405 being made on the touch screen 120.

FIG. 4C shows each icon of the first subset of icons 402 in a larger size than the icons of FIG. 4B. In some embodiments, the first subset of icons 402 is displayed at substantially the same size as the plurality of icons 210 displayed on the home screen. FIG. 4C also shows an add soft button 310 and a configuration soft button 315 that will be explained in more detail below.

FIG. 5A shows a second selected gesture 505 being made. As shown in FIGS. 5B and 5C, the electronic processor 105 may control the touch screen 120 to display a second subset of icons 502 of the plurality of icons 210 when the second selected gesture 505 (in this case, a sideward-oriented, open arrowhead shape) is made on the touch screen 120. For example, FIG. 5A shows the finger 222 of hand 220 making the second selected gesture 505. As indicated by FIG. 5B, the second selected gesture 505 begins near the top-left of the touch screen 120, extends to the right-center of the touch screen 120, and ends near the bottom-left of the touch screen 120. The touch screen 120 detects that the second selected gesture 505 is made and sends a signal associated with the second selected gesture 505 to the electronic processor 105. The electronic processor 105 controls the touch screen 120 to display the second subset of icons 502 of the plurality of icons 210 based on the signal associated with the second selected gesture 505. For example, FIG. 5C shows eight icons of the plurality of icons 210 displayed in the graphical user interface 205. Thus, the second subset of icons 502 includes icons B, C, F, H, P, Q, S, and T and is displayed in response to the second selected gesture 505 being made on the touch screen 120.

As indicated by icon Q in FIGS. 4C and 5C, in some embodiments, one or more icons may be included in one or more subsets of icons. Additionally, the memory 110 may store more than two selected gestures and corresponding subsets of icons. Furthermore, the selected gestures may be any shape, path, or action made by the hand 220 that may be detected by the touch screen 120.

In some embodiments, the electronic processor 105 may control the touch screen 120 to display a subset of icons in a shape substantially similar to the shape of a selected gesture. FIGS. 6B, 6C, 7B, and 7C illustrate such embodiments. For example, FIG. 6A shows a first selected gesture 605 being made. FIGS. 6B and 6C illustrate the touch screen 120 displaying a first subset of icons 602 in response to detecting the first selected gesture 605. FIG. 6A shows the hand 220 making the first selected gesture 605 having a first shape. As indcted by FIG. 6B, the first selected gesture 605 begins near the left-center of the touch screen 120 and continues in a circular shape until the hand 220 reaches near the point at which the first selected gesture 605 was started. The first selected gesture 605 is in the shape of a circle. The touch screen 120 detects that the first selected gesture 605 is made and sends a signal associated with the first selected gesture 605 to the electronic processor 105. The electronic processor 105 controls the touch screen 120 to display a first subset of icons 602 based on the signal associated with the first selected gesture 605. For example, FIG. 6C shows six icons of the plurality of icons 210 displayed in the graphical user interface 205 in a circular shape. The first subset of icons 602 includes icons A, F, G, K, O, and R and is displayed in response to the first selected gesture 605 being made on the touch screen 120.

FIG. 7A shows a second selected gesture 705 being made. FIGS. 7B and 7C illustrate the touch screen 120 displaying a second subset of icons 702 in response to detecting the second selected gesture 705. FIG. 7A shows the hand 220 making the second selected gesture 705 having a second shape of an approximate "X." As indicated by FIG. 7B, the second selected gesture 705 is made on the touch screen 120. The touch screen 120 detects that the second selected gesture 705 is made and sends a signal associated with the second selected gesture 705 to the electronic processor 105. The electronic processor 105 controls the touch screen 120 to display the second subset of icons 702 based on the signal associated with the second selected gesture 705. For example, FIG. 7C shows five icons of the plurality of icons 210 displayed in the graphical user interface 205 in substantially the shape of an "X." The second subset of icons 702 includes icons B, D, K, Q, and L and is displayed in response to the second selected gesture 705 being made on the touch screen 120.

As described in previous paragraphs and as indicated by icon K in FIGS. 6C and 7C, in some embodiments, one or more icons may be included in one or more subsets of icons.

Additionally, the memory 110 may store more than two selected gestures and corresponding subsets of icons. Furthermore, the selected gestures may be any shape, path, or action made by the hand 220 that may be detected by the touch screen 120.

Figures 8A, 8B:
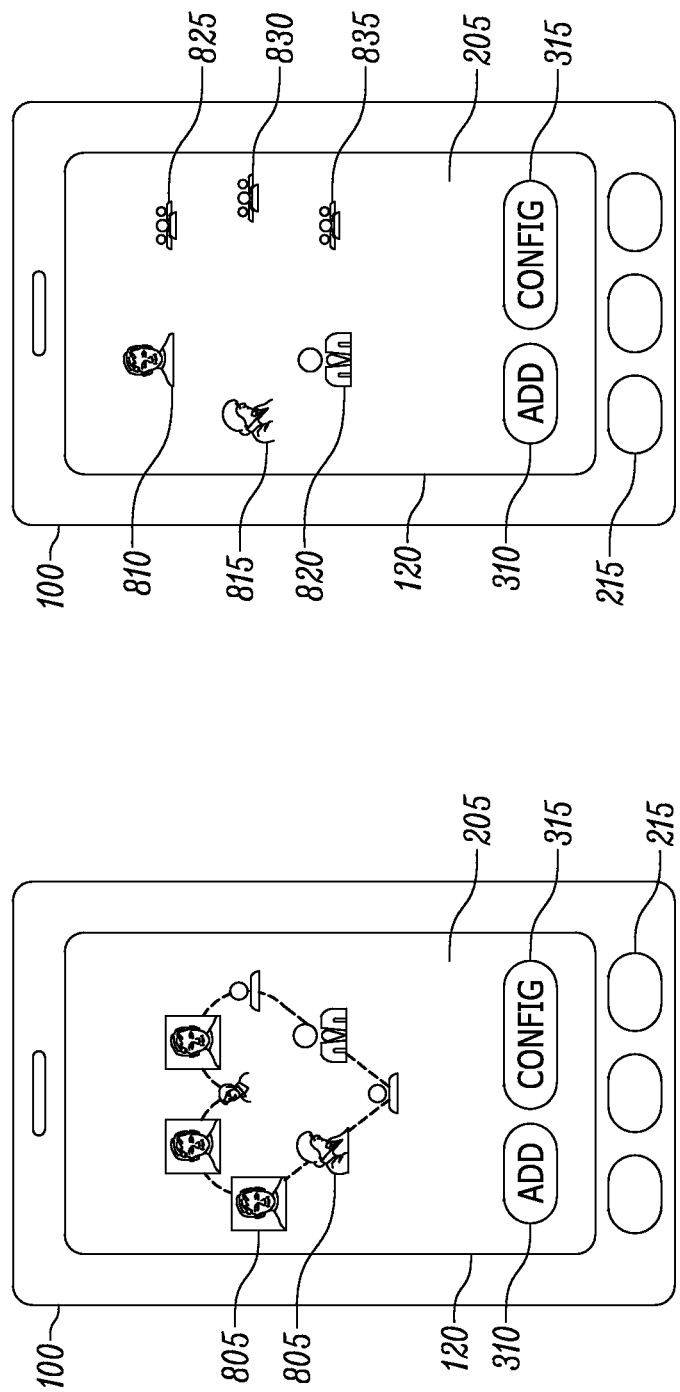
FIGS. 8A and 8B illustrate other subsets of icons displayed on the touch screen of the portable electronic device.

FIGS. 8A and 8B illustrate further exemplary embodiments. FIG. 8A shows a subset of icons displayed on the touch screen 120 in response to the touch screen 120 receiving a heart-shaped gesture from the hand 220. As indicated by the icons 805 in FIG. 8A, in some embodiments, the electronic processor 105 may control the touch screen 120 to display icons 805 that are each associated with a contact saved in memory 110. For example, the heart-shaped gesture may be associated with icons 805 that correspond to personal contacts (i.e., telephone numbers or other contact information of friends and family). Other gestures may be associated with icons that correspond to other types of contacts (i.e., business contacts or public safety contacts). For example, a gesture in the shape of a cross may be associated with emergency icons (i.e., police station contact, hospital contact, etc.).

Additionally, the electronic processor 105 may control the touch screen 120 to display icons that are each associated with a plurality of contacts (i.e., a talk group). Furthermore, as indicated by the icons in FIG. 8B, the electronic processor 105 may control the touch screen 120 to display icons that are each associated with a one of an application, a contact, and/or a plurality of contacts. For example, the circular gesture in FIG. 8B may be associated with icons that correspond to public safety situations. Icon 810 may correspond to contact information for a commander. Icon 815 may correspond to contact information for a dispatcher. Icon 820 may correspond to contact information for a partner. Icons 825, 830, and 835 may correspond to different talk groups, each of which includes a plurality of contacts. Although not shown in FIG. 8B, an icon may also be displayed that corresponds to an application that has particular usefulness in public safety operations. Such applications may include, for example, dispatch information applications, incident history and reporting applications, surveillance video applications, facility and building blueprint and mapping applications, and suspect and criminal record applications, and the like.

Thus, icons corresponding to an application, a contact, and a plurality of contacts may be displayed in the same subset of icons on the touch screen 120.

In some embodiments, the electronic processor 105 controls the touch screen 120 to display a subset of icons in a specified shape that may not be substantially similar to the shape of the gesture associated with the subset of icons. For example, the electronic processor 105 may control the touch screen 120 to display the subset of icons in the shape of a star in response to determining that a circular gesture was made on the touch screen 120. As stated in previous paragraphs with respect to other embodiments, the gestures may be any shape, path, or action made by the hand 220 that may be detected by the touch screen 120. Furthermore, the shapes in which the subset icons is displayed are not limited by the examples provided herein.

Figure 9:
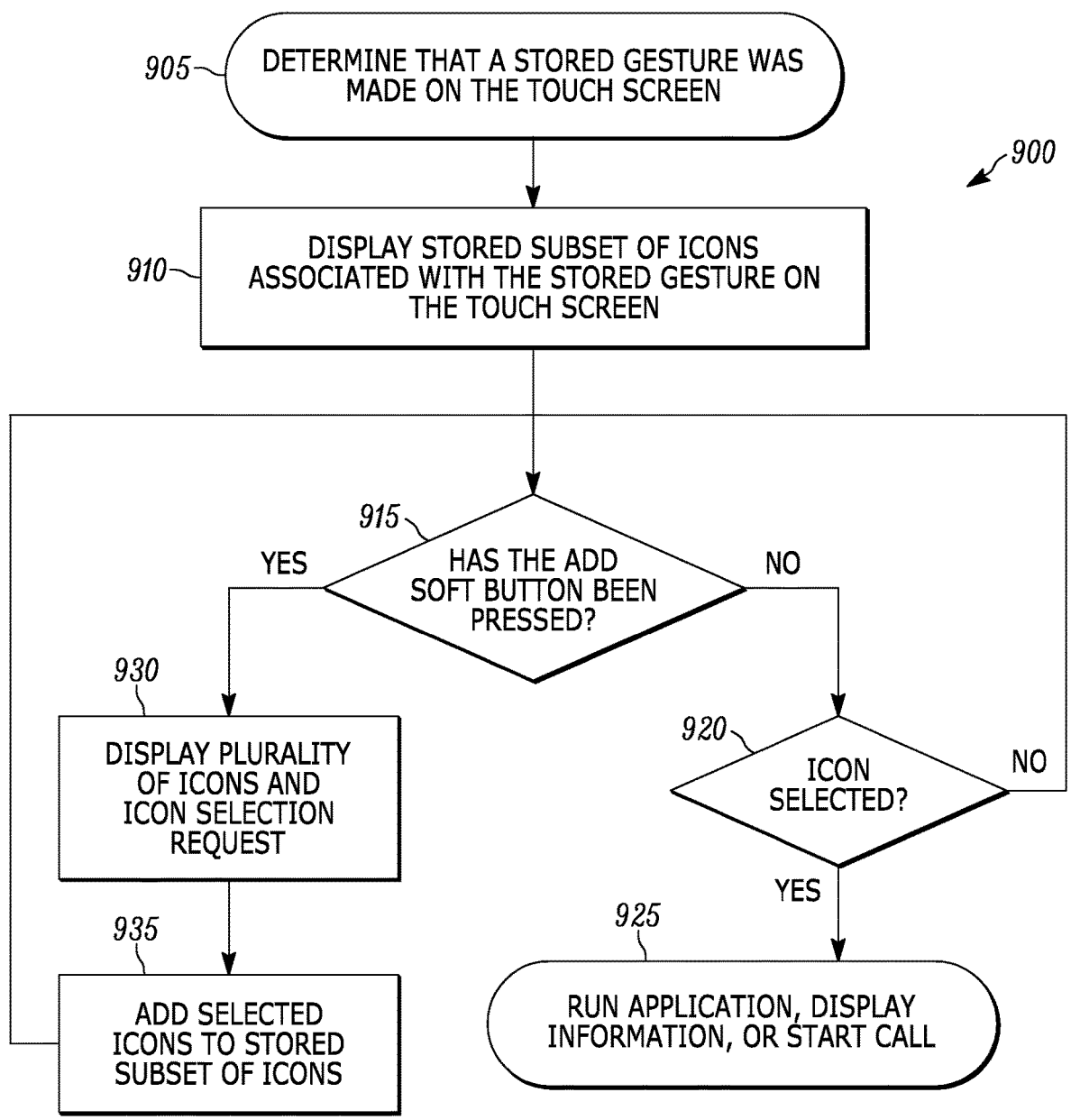
FIG. 9 illustrates a flowchart of a method of controlling the touch screen and adding icons to a stored subset of icons that are associated with a stored gesture.

FIG. 9 illustrates a flowchart of a method 900 of controlling the touch screen 120 and adding icons to a stored subset of icons that are associated with a stored gesture. At block 905, the electronic processor 105 determines that a stored gesture was made on the touch screen 120. At block 910, the electronic processor 105 controls the touch screen 120 to display the stored subset of icons associated with the stored gesture. At block 915, the electronic processor 105 determines whether the add soft button 410 has been pressed on the touch screen 120.

When the electronic processor 105 determines that the add soft button 410 has not been pressed, at block 920 the electronic processor 105 determines whether an icon was selected from the stored subset of icons being displayed on the touch screen 120. When the electronic processor 105 determines that an icon has been selected, at block 925, the electronic processor 105 runs the application, displays contact or talk group information, or starts a call depending on whether the icon selected corresponds to an application, a contact, or a talk group. When the electronic processor 105 determines that an icon has not been selected, the method 900 continues back to block 915.

At block 915, when the electronic processor 105 determines that the add soft button 410 has been pressed, at block 930, the electronic processor 105 controls the touch screen 120 to display a plurality of icons and the icon selection request, as explained in previous paragraphs. The plurality of icons maybe displayed as described in previous paragraphs with respect to block 320 of FIG. 3. At block 935, the electronic processor 105 adds the selected icons to the stored subset of icons and the method 900 proceeds to block 915.

Figure 10:
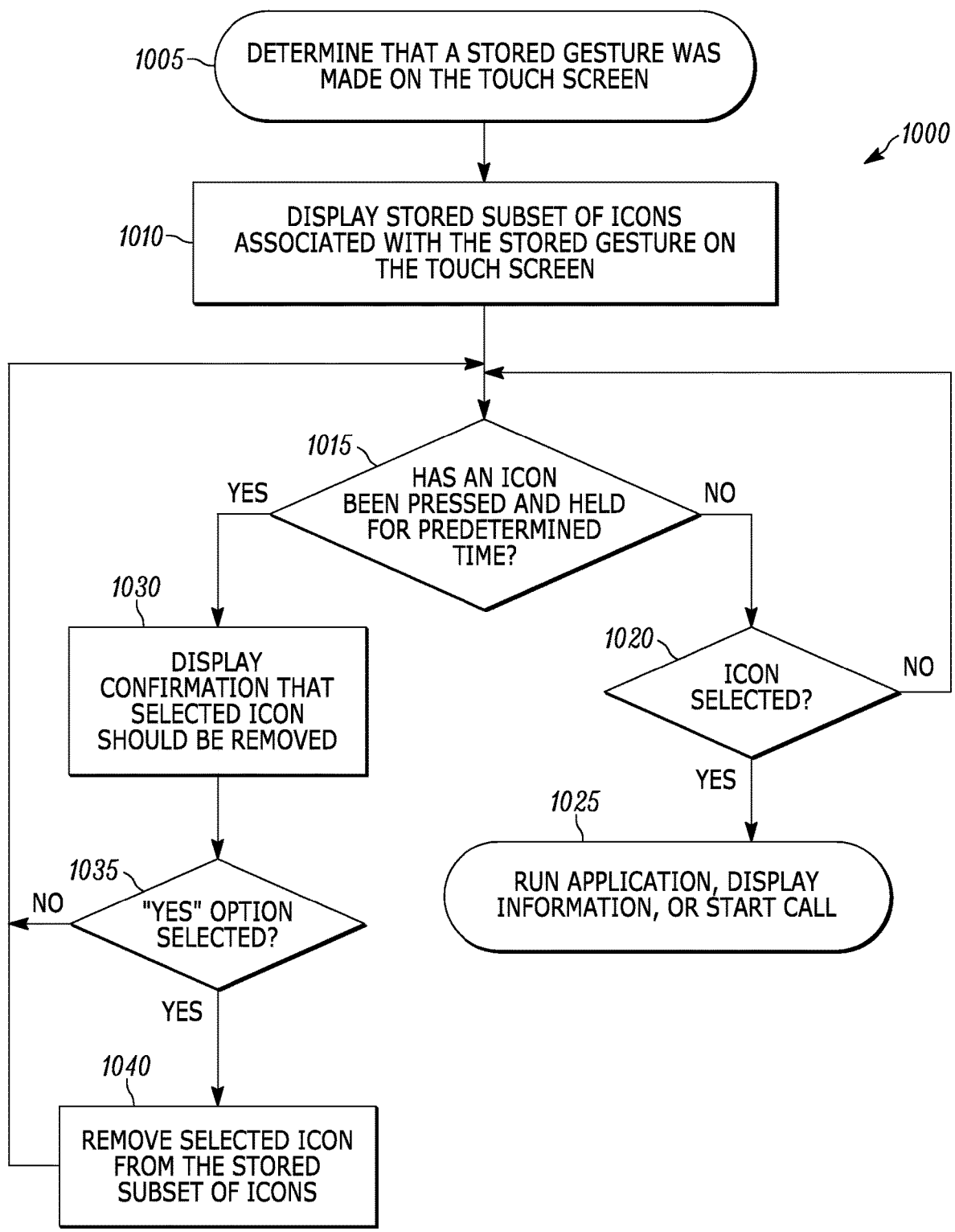
FIG. 10 illustrates a flowchart of a method of controlling the touch screen and removing icons from a stored subset of icons that are associated with a stored gesture.

FIG. 10 illustrates a flowchart of a method 1000 of controlling the touch screen 120 and removing icons from a stored subset of icons that are associated with a stored gesture. At block 1005, the electronic processor 105 determines that a stored gesture was made on the touch screen 120. At block 1010, the electronic processor 105 controls the touch screen 120 to display the stored subset of icons associated with the stored gesture. At block 1015, the electronic processor 105 determines whether an icon has been pressed and held for a predetermined time on the touch screen 120.

When the electronic processor 105 determines that an icon has not been pressed and held for a predetermined time, at block 1020, the electronic processor 105 determines whether an icon was selected from the subset of icons being displayed on the touch screen 120. When the electronic processor 105 determines that an icon has been selected, at block 1025, the electronic processor 105 runs the application, displays contact or talk group information, or starts a call depending on whether the icon selected corresponds to an application, a contact, or a talk group. When the electronic processor 105 determines that an icon has not been selected, the method 1000 continues back to block 1015.

At block 1015, when the electronic processor 105 determines that an icon has been pressed and held for a predetermined time, at block 1030, the electronic processor 105 controls the touch screen 120 to display a confirmation that the selected icon should be removed from the stored subset of icons. At block 1035, when a "No" option is selected in response to the confirmation, the electronic processor 105 receives a corresponding signal from the touch screen 120, does not remove the selected icon from the stored subset of icons, and the method 1000 proceeds back to block 1015. When a "Yes" option is selected in response to the confirmation, at block 1040, the electronic processor 105 receives a corresponding signal from the touch screen 120, removes the selected icon from the stored subset of icons, and proceeds to block 1015.

Figure 11:
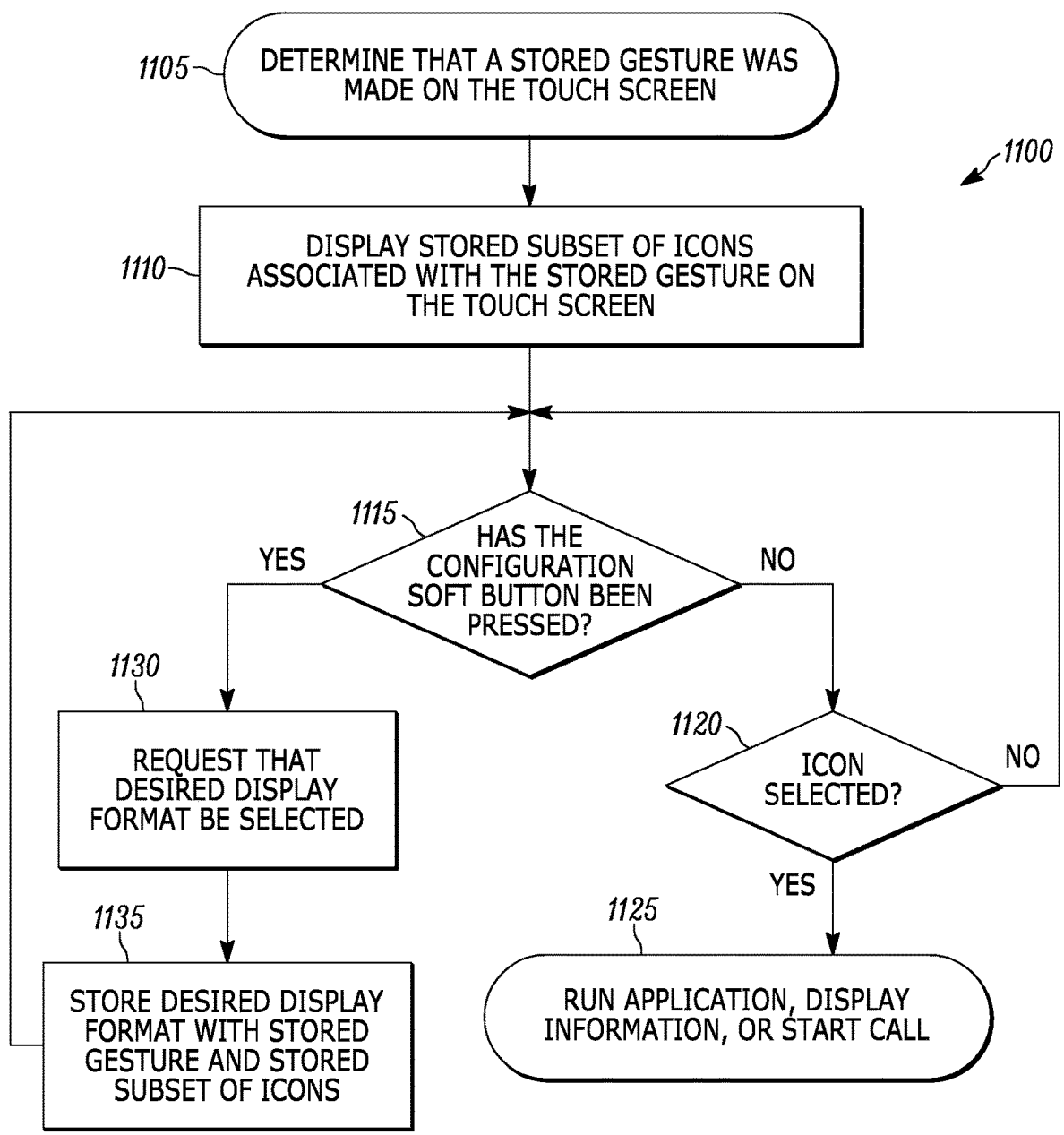
FIG. 11 illustrates a flowchart of a method of controlling the touch screen and storing a desired display format for the touch screen to display a stored subset of icons.

FIG. 11 illustrates a method 1100 of controlling the touch screen 120 and storing a desired display format for the touch screen 120 to display a stored subset of icons. At block 1105, the electronic processor 105 determines that a stored gesture was made on the touch screen 120. At block 1110, the electronic processor 105 controls the touch screen 120 to display the stored subset of icons associated with the stored gesture. At block 1115, the electronic processor 105 determines whether the configuration soft button 415 been pressed.

When the electronic processor 105 determines that the configuration soft button 415 been not been pressed, at block 1120 the electronic processor 105 determines whether an icon was selected from the subset of icons being displayed on the touch screen 120. When the electronic processor 105 determines that an icon has been selected, at block 1125, the electronic processor 105 runs the application, displays contact or talk group information, or starts a call depending on whether the icon selected corresponds to an application, a contact, or a talk group. When the electronic processor 105 determines that an icon has not been selected, the method 1100 continues back to block 1115.

At block 1115, when the electronic processor 105 determines that the configuration soft button 415 has been pressed, at block 1130, the electronic processor 105 controls the touch screen 120 to request that a desired display format be selected for the stored subset of icons (i.e., whether the stored subset of icons should be displayed in the shape of the stored gesture or should be displayed in table/list). At block 1135, the electronic processor 105 stores the selected desired display format in memory 110.

Figure 12:
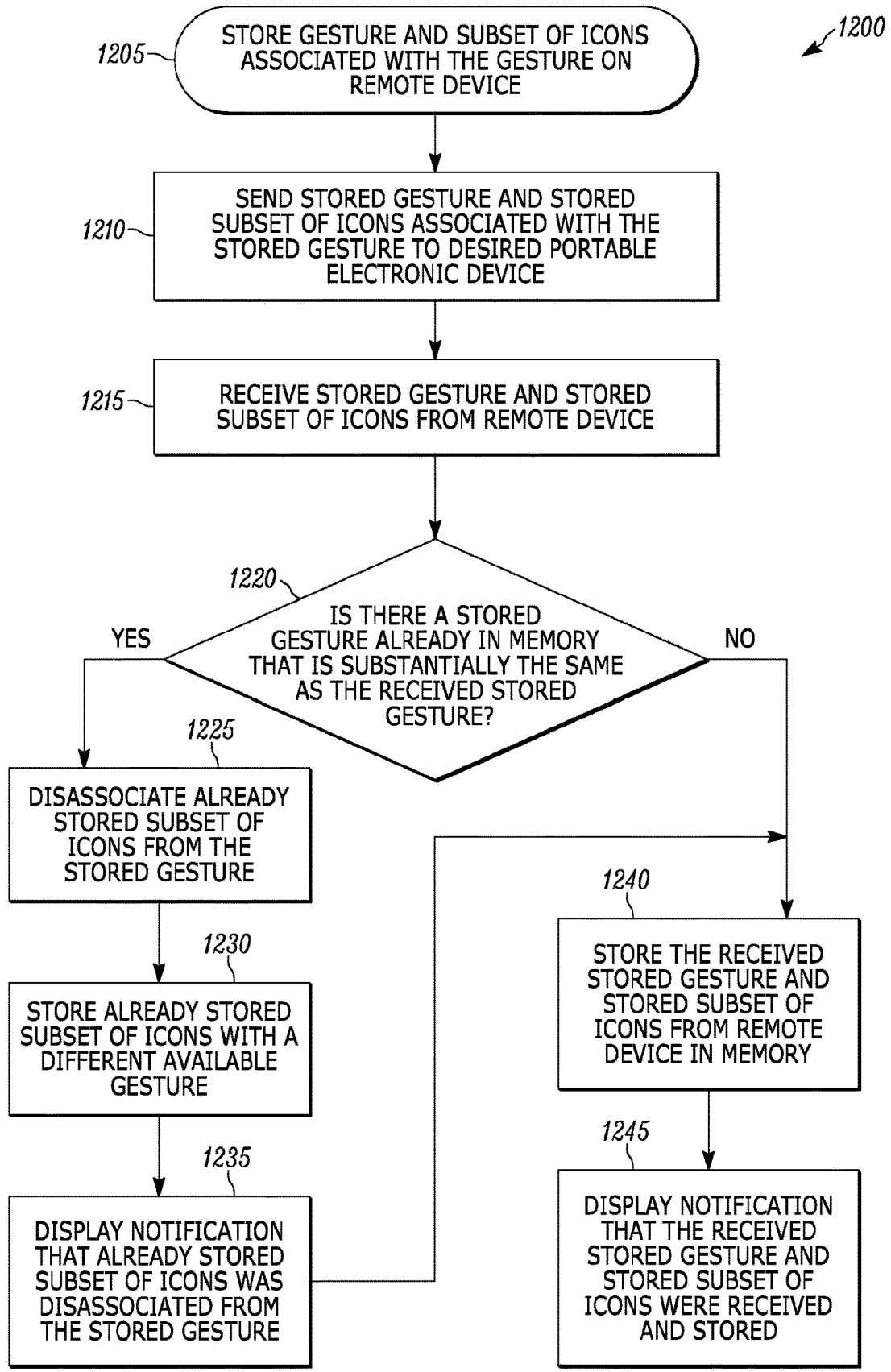
FIG. 12 illustrates a flowchart of a method of remotely receiving settings relating to a stored gesture and a stored subset of icons on the portable electronic device.

FIG. 12 illustrates a method 1200 of remotely receiving settings related to a stored gesture and a stored subset of icons on the transceiver 115 of the portable electronic device 100 (i.e., group-defined gestures and associated subsets of icons). For example, an administrator at a public safety agency may send a stored gesture and associated stored subset of icons to employees of the public safety agency for use on the portable electronic device 100 of each employee. At block 1205, a gesture and a subset of icons are stored in memory of a remote device in a similar manner as was described in previous paragraphs with respect to the portable electronic device 100. At block 1210, the remote device sends the stored gesture and stored subset of icons associated with the stored gesture to desired portable electronic devices 100. In some embodiments, the remote device may be a portable electronic device 100 or another electronic device (i.e., a desktop computer).

At block 1215, the desired portable electronic device 100 receives the stored gesture and stored subset of icons from the remote device. At block 1220, the electronic processor 105 on the desired portable electronic device 100 determines whether there is a stored gesture already in memory 110 that is substantially the same as the received stored gesture. When there is a stored gesture already in memory 110 that is substantially the same as the received stored gesture, at block 1225, the electronic processor 105 disassociates an already stored subset of icons from the stored gesture. At block 1230, the electronic processor 105 stores the already stored subset of icons to be associated with a different, available gesture (i.e., a gesture that does not already have a subset of icons with which it is associated). At block 1235, the electronic processor 105 controls the touch screen 120 to display a notification that the already stored subset of icons were disassociated from the stored gesture and associated with the different, available gesture. The method 1200 then proceeds to block 1240.

At block 1220, when there is not a stored gesture already in memory 110 that is substantially the same as the received stored gesture, at block 1240, the electronic processor 105 stores the received stored gesture and stored subset of icons from the remote device in memory 110. At block 1245, the electronic processor 105 controls the touch screen 120 to display a notification that the received stored gesture and the stored subset of icons were received from remote device and stored in the memory 110.

Figure 13:
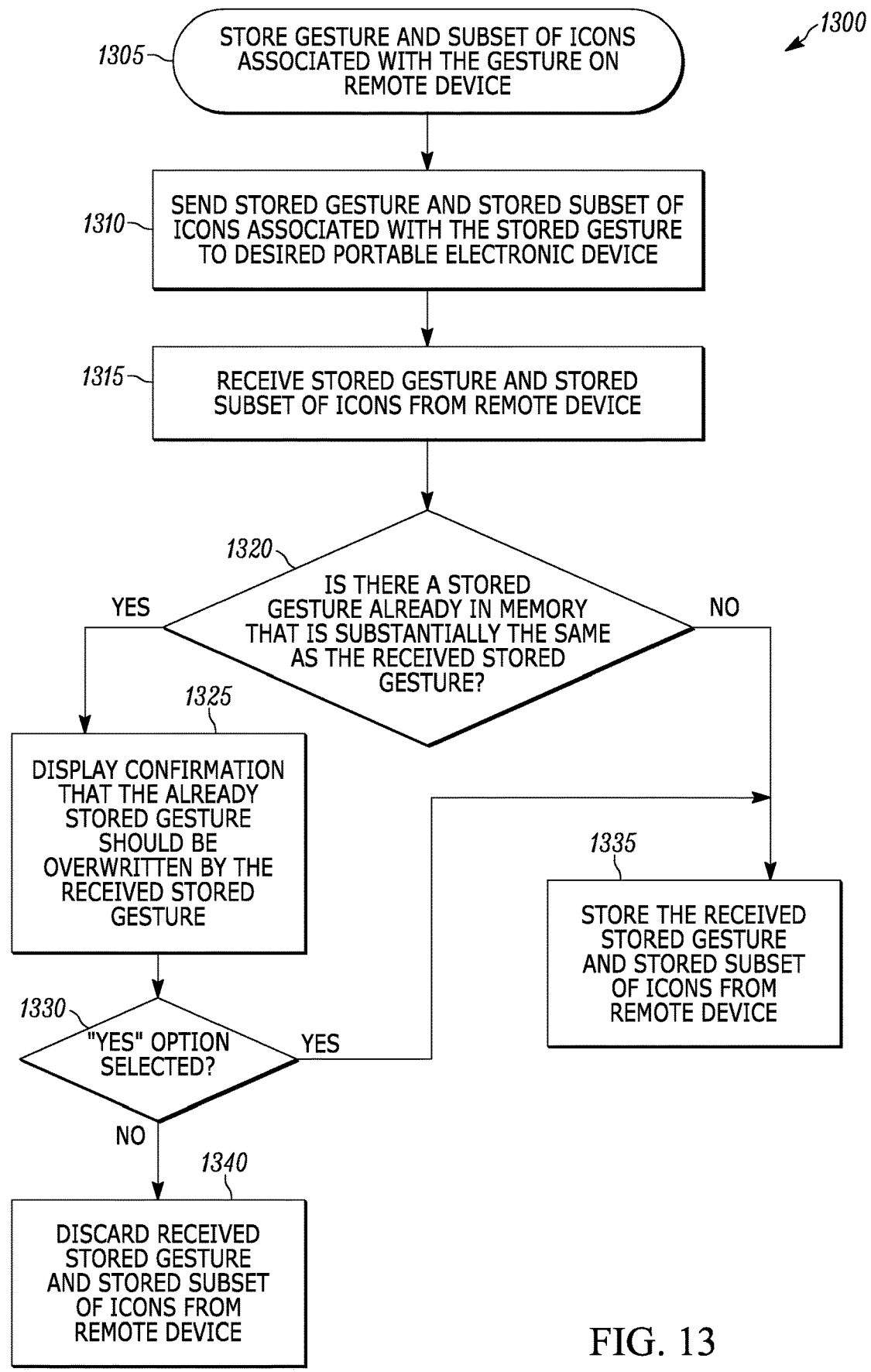
FIG. 13 illustrates a flowchart of another method of remotely receiving settings relating to a stored gesture and a stored subset of icons on the portable electronic device.

FIG. 13 illustrates another method 1300 of remotely receiving settings related to a stored gesture and a stored subset of icons on the transceiver 115 of the portable electronic device 100. At block 1305, a gesture and a subset of icons are stored in memory of a remote device in a similar manner as was described in previous paragraphs with respect to the portable electronic device 100. At block 1310, the remote device sends the stored gesture and stored subset of icons associated with the stored gesture to desired portable electronic devices 100. In some embodiments, the remote device may be a portable electronic device 100 or another electronic device (i.e., a desktop computer).

At block 1315, the desired portable electronic device 100 receives the stored gesture and stored subset of icons from the remote device. At block 1320, the electronic processor 105 on the desired portable electronic device 100 determines whether there is a stored gesture already in memory 110 that is substantially the same as the received stored gesture. When there is a stored gesture already in memory 110 that is substantially the same as the received stored gesture, at block 1325, the electronic processor 105 controls the touch screen 120 to display a confirmation that the already stored gesture and associated subset of icons should be overwritten in memory 110 by the received stored gesture and stored subset of icons.

At block 1330, when the "Yes" option is selected in response to the confirmation, the electronic processor 105 receives a corresponding signal from the touch screen 120, proceeds to block 1335, and stores the received stored gesture and stored subset of icons from the remote device in memory 110.

In some embodiments, the electronic processor 105 may preserve existing settings on the desired portable electronic device 100 before storing the received stored gesture and stored subset of icons. For example, when there is a stored gesture already in memory 110 that is substantially the same as the received stored gesture, there is also an already stored subset of icons associated with the already stored gesture. To prevent the already stored subset of icons from being deleted by the received settings from the remote device, the electronic processor 105 may re-associate the already stored subset of icons with a different, available gesture (i.e., a gesture that does not already have a subset of icons with which it is associated). The electronic processor 105 may then control the touch screen 120 to display a notification that such re-association occurred. This process is similar to blocks 1225, 1230, and 1235 of FIG. 12 and is explained in previous paragraphs. In alternate embodiments, the electronic processor 105 may delete the already stored subset of icons from the memory 110 without re-associating the already stored subset of icons with a different, available gesture.

At block 1330, when the "No" option is selected in response to the confirmation that the already stored gesture and associated subset of icons should be overwritten in memory 110, at block 1340, the electronic processor 105 receives a corresponding signal from the touch screen 120, and discards the received stored gesture and stored subset of icons from the remote device. In some embodiments, the electronic processor 105 may control the transceiver 115 to communicate to the remote device that the stored gesture and stored subset of icons received from the remote device were not stored in the memory 110 of the portable electronic device 100. At block 1320, when there is not a stored gesture already in memory 110 that is substantially the same as the received stored gesture, the method 1300 proceeds to block 1335.

In some embodiments, when the received stored gesture is not substantially the same as an already stored gesture in memory 110, the electronic processor 105 may control the touch screen 120 to display a confirmation before storing the received stored gesture and stored subset of icons in memory 110, as explained in previous paragraphs.

Additionally, in some embodiments, gestures and associated subsets of icons may be pre-programmed into the memory 110 of the portable electronic device 100. The electronic processor 105 may execute methods 900, 1000, 1100, 1200, and 1300 in conjunction with each other while controlling the touch screen 120 to display a subset of icons.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of displaying icons in a graphical user interface displayed on a touch screen of a portable electronic device, the method comprising:

displaying a gesture input request on the touch screen, the gesture input request indicating that a gesture is to be made on the touch screen;

reading the gesture from the touch screen and storing a representation of the gesture in a memory of the portable electronic device as a first selected gesture, the first selected gesture having a first shape;

displaying a plurality of icons on the touch screen;

displaying an icon selection request on the touch screen, the icon selection request indicating that a selection of a first subset of icons from the plurality of icons is to be performed, receiving, with the touch screen, the selection of the first subset of icons from the plurality of icons;

associating, with an electronic processor of the portable electronic device, the first subset of icons of the plurality of icons with the first selected gesture;

detecting, with the touch screen and the electronic processor of the portable electronic device, whether the first selected gesture is made on the touch screen; and displaying, with the touch screen of the portable electronic device, the first subset of icons on the touch screen in response to detecting the first selected gesture on the touch screen.

2. The method of claim 1, further comprising:

associating, with the electronic processor of the portable electronic device, a second subset of icons of the plurality of icons with a second selected gesture having a second shape;

detecting, with the touch screen and the electronic processor of the portable electronic device, whether the second selected gesture is made on the touch screen; and displaying, with the touch screen of the portable electronic device, the second subset of icons on the touch screen in response to detecting the second selected gesture on the touch screen.

3. The method of claim 1, wherein displaying the first subset of icons on the touch screen includes displaying the first subset of icons on the touch screen in a shape similar to the first shape of the first selected gesture.

4. The method of claim 1, wherein displaying the first subset of icons on the touch screen includes associating, with the electronic processor of the portable electronic device, each icon of the first subset of icons with at least one of the group consisting of an application, a contact, and a plurality of contacts on the portable electronic device.

5. The method of claim 1, wherein the first shape of the first selected gesture is or is similar to one of the group consisting of a circle, an oval, a triangle, a heart, a square, and a letter of an alphabet.

6. The method of claim 1, further comprising remotely receiving settings, by a transceiver of the portable electronic device, wherein remotely receiving settings, by the transceiver of the portable electronic device, includes receiving the first selected gesture and the first subset of icons associated with the first selected gesture.

7. The method of claim 6, wherein remotely receiving settings, by the transceiver of the portable electronic device, includes remotely receiving settings, by the transceiver of the portable electronic device, from a remote device associated with a public safety agency.

8. A portable electronic device comprising:

a memory;

a touch screen; and an electronic processor configured to display a gesture input request on the touch screen, the gesture input request indicating that a gesture is to be made on the touch screen, read the gesture from the touch screen and store a representation of the gesture in the memory as a first selected gesture, the first selected gesture having a first shape, display a plurality of icons on the touch screen, display an icon selection request on the touch screen, the icon selection request indicating that a selection of a first subset of icons from the plurality of icons is to be performed, receiving the selection of the first subset of icons from the plurality of icons, associate the first subset of icons of the plurality of icons with the first selected gesture, detect whether the first selected gesture is made on the touch screen, and control the touch screen to display the first subset of icons on the touch screen in response to detecting the first selected gesture on the touch screen.

9. The portable electronic device of claim 8, wherein the electronic processor is configured to:

associate a second subset of icons of the plurality of icons with a second selected gesture having a second shape, detect whether the second selected gesture is made on the touch screen, and control the touch screen to display the second subset of icons on the touch screen in response to detecting the second selected gesture on the touch screen.

10. The portable electronic device of claim 8, wherein the first subset of icons is displayed on the touch screen in a shape similar to the first shape of the first selected gesture.

11. The portable electronic device of claim 8, wherein each icon of the first subset of icons is associated with at least one of the group consisting of an application, a contact, and a plurality of contacts on the portable electronic device.

12. The portable electronic device of claim 8, wherein the first shape of the first selected gesture is or is similar to one of the group consisting of a circle, an oval, a triangle, a heart, a square, and a letter of an alphabet.

13. The portable electronic device of claim 8, further comprising a transceiver, wherein the first selected gesture and the first subset of icons are remotely received by the transceiver.

14. The portable electronic device of claim 13, wherein the first selected gesture and the first subset of icons are received from a remote device that is associated with a public safety agency.

15. A method of displaying icons on a touch screen of a portable electronic device, the method comprising:

displaying on the touch screen a gesture input request, the gesture input request indicating that a gesture is to be made on the touch screen;

reading the gesture from the touch screen and storing a representation of the gesture in a memory of the portable electronic device as a first selected gesture, the first selected gesture having a first shape;

displaying a plurality of icons on the touch screen;

displaying on the touch screen an icon selection request, the icon selection request indicating that a selection from the plurality of icons is to be performed, the selection from the plurality of icons generating a first subset of icons;

reading an input on the touch screen;

determining whether the input matches the first selected gesture; and when the input matches the first selected gesture, displaying the first subset of icons on the touch screen.

16. The method of claim 15, further comprising:

associating, with an electronic processor of the portable electronic device, a second subset of icons of the plurality of icons with a second selected gesture having a second shape;

reading the input on the touch screen;

determining whether the input matches the second selected gesture; and when the input matches the second selected gesture, displaying the second subset of icons on the touch screen.

17. The method of claim 16, further comprising remotely receiving settings, on the portable electronic device, wherein remotely receiving settings includes receiving the second selected gesture and the second subset of icons associated with the second selected gesture.

18. The method of claim 15, wherein displaying the first subset of icons on the touch screen includes displaying the first subset of icons in a shape similar to the first shape of the first selected gesture.

\* \* \* \* \*